Oct. 12, 1948.                S. F. BLOOM                2,451,378
PRECISION CANNON PINION TIGHTENER
Filed Aug. 18, 1947
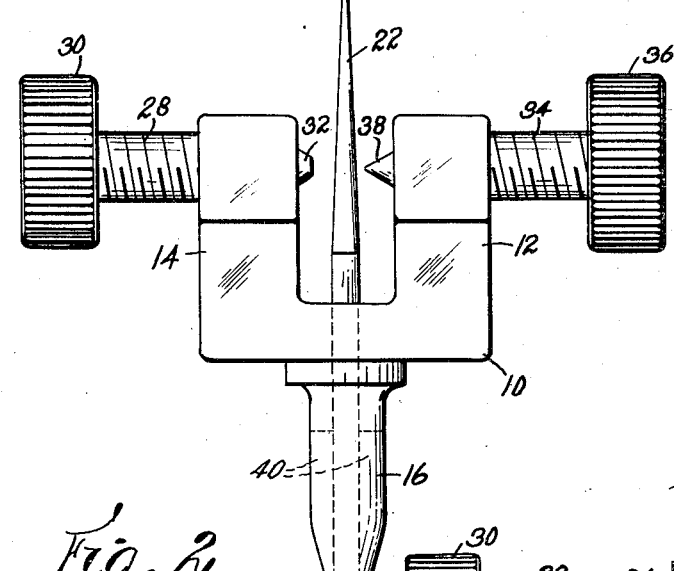
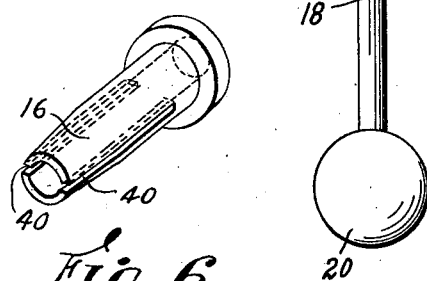
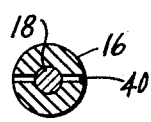
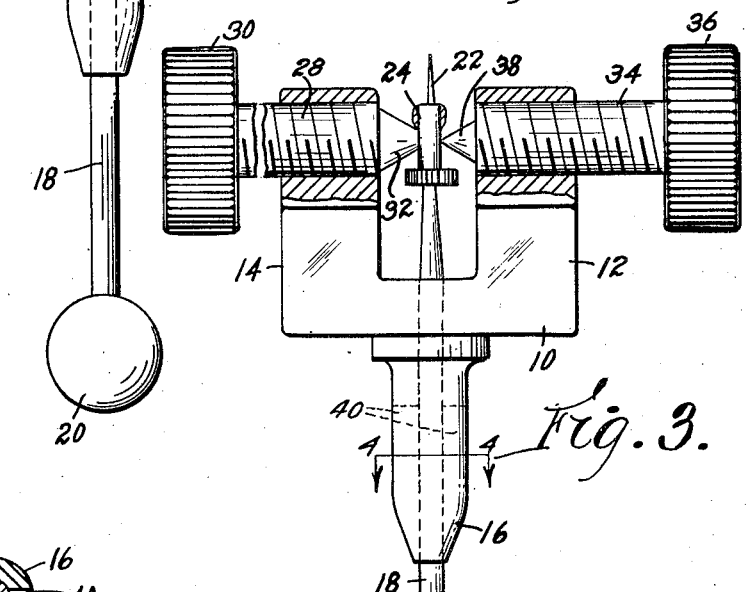
INVENTOR.
Sven F. Bloom.
BY Charles R. Fay.
ATTORNEYS.

Patented Oct. 12, 1948

2,451,378

UNITED STATES PATENT OFFICE 2,451,378

PRECISION CANNON PINION TIGHTENER

Sven F. Bloom, Rutland, Mass.

Application August 18, 1947, Serial No. 769,512

5 Claims. (Cl. 81—6)

This invention relates to cannon pinion tighteners for watch makers but the invention is to be understood to be applicable to various other similar operations for other articles and is not limited to cannon pinions although it is so illustrated in the accompanying drawing.

The principal object of the invention resides in the provision of a frame slidably supporting a spindle which has a long sharp point to receive a hollow workpiece or the like so that by manipulating the spindle the workpiece may be positioned against an adjustable stop which may be used as an anvil against which the work is pressed by an adjustable tool working from the opposite side of the workpiece to the end that the workpiece may be deformed or pressed by controlled pressure while being held in such a way that the pressure may be applied exactly where it is desired regardless of the small size of the workpiece.

Other objects and advantages of the invention will appear hereinafter.

Reference is to be had to the accompanying drawing in which

Fig. 1 illustrates a cannon pinion which is to be operated on;

Fig. 2 is an enlarged view in front elevation of a tool according to the invention;

Fig. 3 is a view similar to Fig. 2 but with parts in section and broken away and showing the tool in use; and Fig. 4 is a section on line 4—4 of Fig. 3.

Fig. 5 is an end elevation of the anvil member.

Fig. 6 is a perspective view of the friction collet which is adapted to hold the spindle in adjusted position.

By way of illustrating the invention there is provided a small but solid and strong frame generally indicated at 10, this frame having a pair of spaced legs 12 and 14 upstanding therefrom. Each leg 12 and 14 is drilled and tapped to provide two screw threaded openings which are axially alined, these openings being spaced by the space between the arms 12 and 14.

Below the frame there is secured a split collet generally indicated at 16, this collet being hollow and accommodating an elongated spindle 18 which may be provided with a handle 20 or the like. Spindle 18 is provided with a sharp point as at 22 for the purpose of receiving a hollow workpiece or a workpiece with some kind of a hollow in it and it is to be noted that the spindle 18 is centrally located between the arms and intersects the axis of the tapped holes in the arms.

As shown in Fig. 1, the particular workpiece illustrated herein comprises a long hollow shank 24 which is provided with a gear 26, this being the cannon pinion of a watch and it is seen that this cannon pinion may be slid over the point 22 into the position shown in Fig. 3 by retracting the spindle and centering it where desired.

The tapped opening in the arm 14 is provided with a threaded member 28 having an operating knob 30 and a conical end 32 which acts as a positioner for the cannon pinion and also as an anvil as will be later described.

The tapped opening in the arm 12 is provided with a threaded member 34 having an operating knob 36 at one end and a conical working member 38.

When the workpiece has been positioned as in Fig. 3, the operating knob 36 is turned so as to impinge at point 38 against the shank of the cannon pinion deforming the same so as to reduce the inside diameter at a certain point so that the cannon pinion will be more tightly secured to its shaft.

The conical part 32 acts as an anvil, as clearly shown in Fig. 3, where the work 24 is held in position on the flat end of the conical part 32 while the pointed cone 38 is brought up and presses on the work held against the part 32.

The spindle 18 is frictionally held in the collet 16 which is split as shown at 40 so as to provide sufficient friction to hold the spindle wherever it is positioned longitudinally in the collet and by this means the workpiece is positioned and held so that the deformation or "bumping" of the cannon pinion may be done wherever it is desired; and it will be seen that this invention provides a tool for accomplishing the purposes stated with a fine degree of accuracy and control so that just the right amount of "bumping" or deformation of the cannon pinion shank is achieved. This avoids the haphazard methods of the prior art wherein it has been necessary to squeeze the shank of the cannon pinion as by a pair of pliers and then try the pinion on the pinion shaft. This operation must be repeated several times until the fit of the pinion on the shaft is exactly as desired. By means of the present invention, however, it will be seen that the "bumping" or deformation may be accurately controlled and the operation only needs to be done once thus saving time and also providing for a better fit of the pinion on the shaft.

If desired, the flattened end of the anvil 32 may be provided with grooves 42 to better hold the cannon pinion in a plurality of different positions.

Having thus described my invention and the advantages thereof, I do not wish to be limited to the details herein disclosed otherwise than as set forth in the claims, but what I claim is:

1. A bumping device comprising a base, a pair of spaced arms thereon, an element in each arm, interengaging means on the respective arms and elements for controlled adjustment of said elements toward each other, the elements being alined, a collet on the base, a longitudinally adjustable spindle in the collet and frictionally held therein for movement of the spindle against the friction of the collet, said spindle being pointed and disposed intermediate the elements and arms for holding an apertured workpiece between the elements, one of the latter being a bumping tool and the other acting as an anvil to resist deflection of the spindle under the action of the bumping tool and to position the workpiece.

2. A cannon pinion tightener consisting of a base having a pair of arms, an anvil member screw-threaded on and extending through one of said arms, a bumping member aligned with the anvil member and screw-threaded through the other arm, a pointed workpiece holding spindle for receiving the cannon pinion, said spindle being slidable manually through the base between said arms so that the work thereon may be operated upon by the bumping and anvil members, and means attached to the base and engaging the spindle to hold the spindle in any position to which it may be put by the operator.

3. A device of the class described comprising a base, a workpiece supporting spindle, means on the base slidably supporting the spindle, said means being frictional and yieldingly holding the spindle where placed by the operator, and a pair of aligned and individually adjusted elements on the base arranged on opposite sides of the spindle to contact and work on a workpiece held on the spindle, the latter being movable by the operator transversely to the direction of movement of said elements to position the workpiece as desired.

4. A device of the class described comprising a base, a longitudinally slidable tapered spindle thereon for receiving and holding an apertured workpiece, operator-adjusted means screw-threaded on the base including an anvil to hold the workpiece against pressure transverse of the spindle, operator-controlled means also screw-threaded on the base including a bumping tool adapted to apply pressure to the workpiece in a direction to press the same against the first named means, the spindle extending transversely to said two means, and means on the base and engaging the spindle to hold the spindle in its longitudinally adjusted position, said anvil and bumping tool being opposed and coaxial.

5. A device of the class described comprising a base, a longitudinally slidable pointed spindle thereon for receiving and holding an apertured workpiece, operator-adjusted means screw-threaded on the base to hold the workpiece against pressure transverse of the spindle, operator-controlled means also screw-threaded on the base and adapted to apply pressure to the workpiece in a direction to press the same against the first named means, the spindle extending transversely to said two means, and frictional means on the base and engaging the spindle to hold the spindle in its longitudinally adjusted position.

SVEN F. BLOOM.

REFERENCES CITED

The following references are of record in the file of this patent:

UNITED STATES PATENTS

| Number | Name | Date |
| --- | --- | --- |
| 131,188 | Sneider | Sept. 10, 1872 |
| 163,162 | Disston | May 11, 1875 |
| 428,193 | Widdifield | May 20, 1890 |
| 479,823 | Mathison | Aug. 2, 1892 |
| 984,978 | Straub | Feb. 21, 1911 |
| 1,216,717 | Miller | Feb. 20, 1917 |
| 1,408,023 | Nuerwell | Feb. 28, 1922 |
| 1,420,064 | Stiles | June 20, 1922 |
| 1,493,515 | Berthold | May 13, 1924 |
| 1,548,896 | Morgan | Aug. 11, 1925 |
| 1,631,510 | Barrett | June 7, 1927 |
| 1,654,459 | Garrett | Dec. 27, 1927 |
| 1,699,005 | McLean | Jan. 15, 1929 |
| 2,292,625 | Fellers | Aug. 11, 1942 |
| 2,429,139 | Scardaccione | Oct. 14, 1947 |